(12) United States Patent
Hwang et al.

(10) Patent No.: US 11,628,778 B2
(45) Date of Patent: Apr. 18, 2023

(54) VEHICLE-USED BRACKET

(71) Applicant: Cheng Uei Precision Industry Co., LTD., New Taipei (TW)

(72) Inventors: Yuan-Yu Hwang, New Taipei (TW); Xiao-Kang Yang, Dong-Guan (CN); Qin-Xiang Liu, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/676,024

(22) Filed: Feb. 18, 2022

(65) Prior Publication Data

US 2022/0371524 A1 Nov. 24, 2022

(30) Foreign Application Priority Data

May 18, 2021 (CN) .......................... 202121066732.2

(51) Int. Cl.
    *B60R 11/00* (2006.01)
(52) U.S. Cl.
    CPC ....... *B60R 11/00* (2013.01); *B60R 2011/0008* (2013.01); *B60R 2011/0078* (2013.01)
(58) Field of Classification Search
    CPC ..... B60R 2011/0078; B60R 2011/0008; B60R 2011/0085; B60R 2011/0059
    See application file for complete search history.

(56) References Cited

U.S. PATENT DOCUMENTS

| 9,586,530 | B2 * | 3/2017 | Kim | F16M 13/022 |
| D851,650 | S * | 6/2019 | Minn | F16B 2/065 |
| | | | | D14/447 |
| 10,315,585 | B2 * | 6/2019 | Minn | B60R 11/0241 |
| 11,225,203 | B2 * | 1/2022 | Song | B60R 11/0241 |
| 2014/0117926 | A1 * | 5/2014 | Hwu | H02J 50/10 |
| | | | | 320/108 |
| 2021/0178862 | A1 * | 6/2021 | Alves | B60R 11/02 |
| 2022/0371524 | A1 * | 11/2022 | Hwang | B60R 11/00 |
| 2022/0407353 | A1 * | 12/2022 | Hwang | H02J 50/90 |

FOREIGN PATENT DOCUMENTS

| CN | 102076527 | A | * | 5/2011 | ............ | B60R 11/02 |
| CN | 111267745 | A | * | 6/2020 | ......... | B60R 11/0241 |
| CN | 113710541 | A | * | 11/2021 | ............ | B60R 11/02 |
| CN | 215421060 | U | * | 1/2022 | ............ | B60R 11/00 |
| WO | WO-2009147514 | A3 | * | 6/2010 | ............ | B60R 11/02 |

* cited by examiner

*Primary Examiner* — Justin M Larson
(74) *Attorney, Agent, or Firm* — Cheng-Ju Chiang (57) ABSTRACT

A vehicle-used bracket includes a base body, a clamping assembly and a buffering element. The base body has a main portion, a peripheral wall extended upward from a periphery of a top surface of the main portion, and a connecting portion fastened to a bottom surface of the base body. A periphery of a bottom surface of the connecting portion extends downward to form a limiting structure. The clamping assembly is mounted to the bottom surface of the connecting portion. The clamping assembly includes a screw, a fastening element and a claw. The claw has a fastening piece. A top surface of the fastening piece is arched towards the connecting portion to form at least one protruding block. The at least one protruding block is limited in the limiting structure. The buffering element is mounted between the connecting portion and the clamping assembly.

14 Claims, 7 Drawing Sheets

FIG. 7

VEHICLE-USED BRACKET

CROSS-REFERENCE TO RELATED APPLICATION

The present application is based on, and claims priority from, China Patent Application No. 202121066732.2, filed May 18, 2021, the disclosure of which is hereby incorporated by reference herein in its entirety.

BACKGROUND OF THE INVENTION

1. Field of the Invention

The present invention generally relates to a vehicle-used bracket, and more particularly to a vehicle-used bracket for supporting a wireless charger.

2. The Related Art

With the development of a wireless charging technology, a wireless charger is gradually applied to an electronic product. The wireless charger of a mobile phone or a tablet computer is common. The wireless charger changes a conventional charging method to increase a charging efficiency. Currently, the mobile phone or the tablet computer is generally charged by a static placement method, that is to say, the mobile phone or the tablet computer is statically positioned on a placement table. After the electronic product is attached to the wireless charger, the electronic product is able to be charged.

However, because the wireless charger is unable to clamp an air-conditioner outlet in a car, the wireless charger has no way of being fastened to the air-conditioner outlet in the car. As a result, when a user drives the car, the electronic product is inconvenient to be used in a charging process.

Thus, it is essential to provide an innovative vehicle-used bracket for supporting the wireless charger.

SUMMARY OF THE INVENTION

An object of the present invention is to provide a vehicle-used bracket. The vehicle-used bracket includes a base body, a clamping assembly and a buffering element. The base body has a main portion, a peripheral wall extended upward from a periphery of a top surface of the main portion, and a connecting portion fastened to a bottom surface of the base body. The peripheral wall is cooperated with the main portion to form an accommodating space between the main portion and the peripheral wall. The accommodating space receives a wireless charger. A middle of the connecting portion defines a perforation penetrating through a top surface and a bottom surface of the connecting portion. A middle of the base body defines a through-hole. The perforation is communicated with the through-hole. The perforation is communicated with the accommodating space through the through-hole. A periphery of the bottom surface of the connecting portion extends downward to form a limiting structure. The limiting structure is shown as a ring shape. The clamping assembly is mounted to the bottom surface of the connecting portion. The clamping assembly includes a screw, a fastening element and a claw. The claw has a fastening piece. The fastening piece is disposed under the limiting structure of the connecting portion. A middle of the fastening piece defines a fastening hole penetrating through a top surface and a bottom surface of the fastening piece. The fastening hole is corresponding to the perforation and the through-hole. At least one portion of a top surface of the fastening piece is arched towards the bottom surface of the connecting portion to form at least one protruding block. The at least one protruding block is corresponding to the limiting structure. The at least one protruding block is limited in the limiting structure of the connecting portion, so the clamping assembly and the base body are prevented from rotating accidentally. The buffering element is closely mounted in the perforation of the connecting portion and the fastening hole of the fastening piece of the claw. The screw penetrates through a middle of the buffering element. The screw passes upward through the fastening hole. The screw is fastened in the perforation of the connecting portion. The fastening element is located in the through-hole. The screw projects into the through-hole. The fastening element is mounted around a top end of the screw, so the fastening element is fastened to the screw. The buffering element is closely mounted between the connecting portion and the clamping assembly, so at least one of the base body and the clamping assembly is selectively rotated.

Another object of the present invention is to provide a vehicle-used bracket adapted for clamping a wireless charger. The vehicle-used bracket includes a base body, a connecting portion, a clamping assembly and a buffering element. The base body has a main portion, and a peripheral wall extended upward from a periphery of a top surface of the main portion. The peripheral wall is cooperated with the main portion to form an accommodating space between the main portion and the peripheral wall. The accommodating space receives the wireless charger. The connecting portion is fastened to a bottom surface of the base body. A middle of the connecting portion defines a perforation penetrating through a top surface and a bottom surface of the connecting portion. A middle of the base body defines a through-hole. The perforation is communicated with the through-hole. The perforation is communicated with the accommodating space through the through-hole. A periphery of the bottom surface of the connecting portion extends downward to form a limiting structure. The clamping assembly is mounted to the bottom surface of the connecting portion. The clamping assembly includes a screw, a fastening element and a claw. The claw has a fastening piece. The fastening piece is disposed under the limiting structure of the connecting portion. A middle of the fastening piece defines a fastening hole penetrating through a top surface and a bottom surface of the fastening piece. The fastening hole is corresponding to the perforation and the through-hole. At least one portion of a top surface of the fastening piece is arched towards the bottom surface of the connecting portion to form at least one protruding block. The at least one protruding block is corresponding to the limiting structure. The at least one protruding block is limited in the limiting structure of the connecting portion. Several portions of a periphery of the fastening piece slantwise extend downward and inward to form a plurality of clamping portions. The plurality of the clamping portions of the claw form a clamping structure. The buffering element is closely mounted in the perforation of the connecting portion and the fastening hole of the fastening piece of the claw. The screw penetrates through a middle of the buffering element. The screw passes upward through the fastening hole. The screw is fastened in the perforation of the connecting portion. The fastening element is located in the through-hole. The screw projects into the through-hole. The fastening element is mounted around a top end of the screw, so the fastening element is fastened to the screw. The buffering element is closely mounted between the connecting portion and the clamping assembly, so at least one of the base body and the clamping assembly is selectively rotated.

Another object of the present invention is to provide a vehicle-used bracket adapted for clamping a wireless charger. The vehicle-used bracket includes a base body, a connecting portion, a clamping assembly, a buffering element, a chuck bushing and a plurality of sleeves. The base body has a main portion, and a peripheral wall extended upward from a periphery of a top surface of the main portion. The peripheral wall is cooperated with the main portion to form an accommodating space between the main portion and the peripheral wall. The accommodating space receives the wireless charger. The peripheral wall is formed in a ring shape. A top surface of the peripheral wall extends inward to form at least one protruding portion. The connecting portion is positioned to a bottom surface of the base body. A middle of the connecting portion defines a perforation penetrating through a top surface and a bottom surface of the connecting portion. A middle of the base body defines a through-hole. The perforation is communicated with the through-hole. The perforation is communicated with the accommodating space through the through-hole. A periphery of the bottom surface of the connecting portion extends downward to form a limiting structure. The clamping assembly is mounted to the limiting structure. The clamping assembly includes a screw, a fastening element and a claw. The claw has a fastening piece. The fastening piece is abutted against the limiting structure of the connecting portion. A middle of the fastening piece defines a fastening hole penetrating through a top surface and a bottom surface of the fastening piece. The fastening hole is corresponding to the perforation and the through-hole. At least one portion of a top surface of the fastening piece is arched towards the limiting structure to form at least one protruding block. The at least one protruding block is engaged with the limiting structure. Several portions of a periphery of the fastening piece slantwise extend downward and inward to form a plurality of clamping portions. Each clamping portion has an upper clamping section and a lower clamping section. Several portions of the bottom surface of the fastening piece extend downward and are slightly inclined inward to form a plurality of the upper clamping sections. Bottom ends of the plurality of the upper clamping sections extend downward and are slightly inclined inward to form a plurality of the lower clamping sections. The buffering element is closely mounted in the perforation of the connecting portion and the fastening hole of the fastening piece of the claw. The screw penetrates through a middle of the buffering element. The screw passes upward through the fastening hole. The screw is fastened in the perforation of the connecting portion. The fastening element is located in the through-hole. The screw projects into the through-hole. The fastening element is mounted around a top end of the screw, so the fastening element is fastened to the screw. The buffering element is closely mounted between the connecting portion and the clamping assembly, so at least one of the base body and the clamping assembly is selectively rotated. The chuck bushing is mounted between the fastening piece and the plurality of the clamping portions. The chuck bushing has a plurality of insertion holes penetrating through a top surface and a bottom surface of the chuck bushing. The plurality of the clamping portions are inserted downward into the plurality of the insertion holes. The upper clamping sections of the plurality of the clamping portions are located in the plurality of the insertion holes. The lower clamping sections of the plurality of the clamping portions are exposed out of the chuck bushing. The plurality of the lower clamping sections of the plurality of the clamping portions are fastened in the plurality of the sleeves.

As described above, the base body includes the main portion and the peripheral wall, the peripheral wall is mounted around the top surface of the main portion, a middle of the peripheral wall forms the accommodating space between the main portion and the peripheral wall, the accommodating space is used for fastening the wireless charger, top surfaces of a plurality of arc blocks extend towards the accommodating space to form a plurality of protruding portions, each protruding portion is used for abutting a top surface of the wireless charger, so that the vehicle-used bracket is used for accommodating the wireless charger, and the wireless charger is fastened in the base body. In addition, the vehicle-used bracket is fastened to an air-conditioner outlet of the car by virtue of the clamping assembly clamping grids of the air-conditioner outlet of the car.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

With reference to FIG. 1 to FIG. 7, a vehicle-used bracket 100 in accordance with a preferred embodiment of the present invention is shown. The vehicle-used bracket 100 is used for supporting a wireless charger (not shown), and the vehicle-used bracket 100 is fastened to an air-conditioner outlet (not shown) in a car (not shown). The vehicle-used bracket 100 includes a base body 10, a connecting portion 30, a clamping assembly 40 and a buffering element 50.

In order to describe the vehicle-used bracket 100 conveniently, in the preferred embodiment, a top surface 101 of the base body 10 is close to the wireless charger (not shown), and a bottom surface 102 of the base body 10 is close to the air-conditioner outlet (not shown) in the car (not shown). The bottom surface 102 of the base body 10 is disposed towards the air-conditioner outlet of the car. The top surface 101 of the base body 10 is opposite to the bottom surface 102 of the base body 10.

Figure 1:
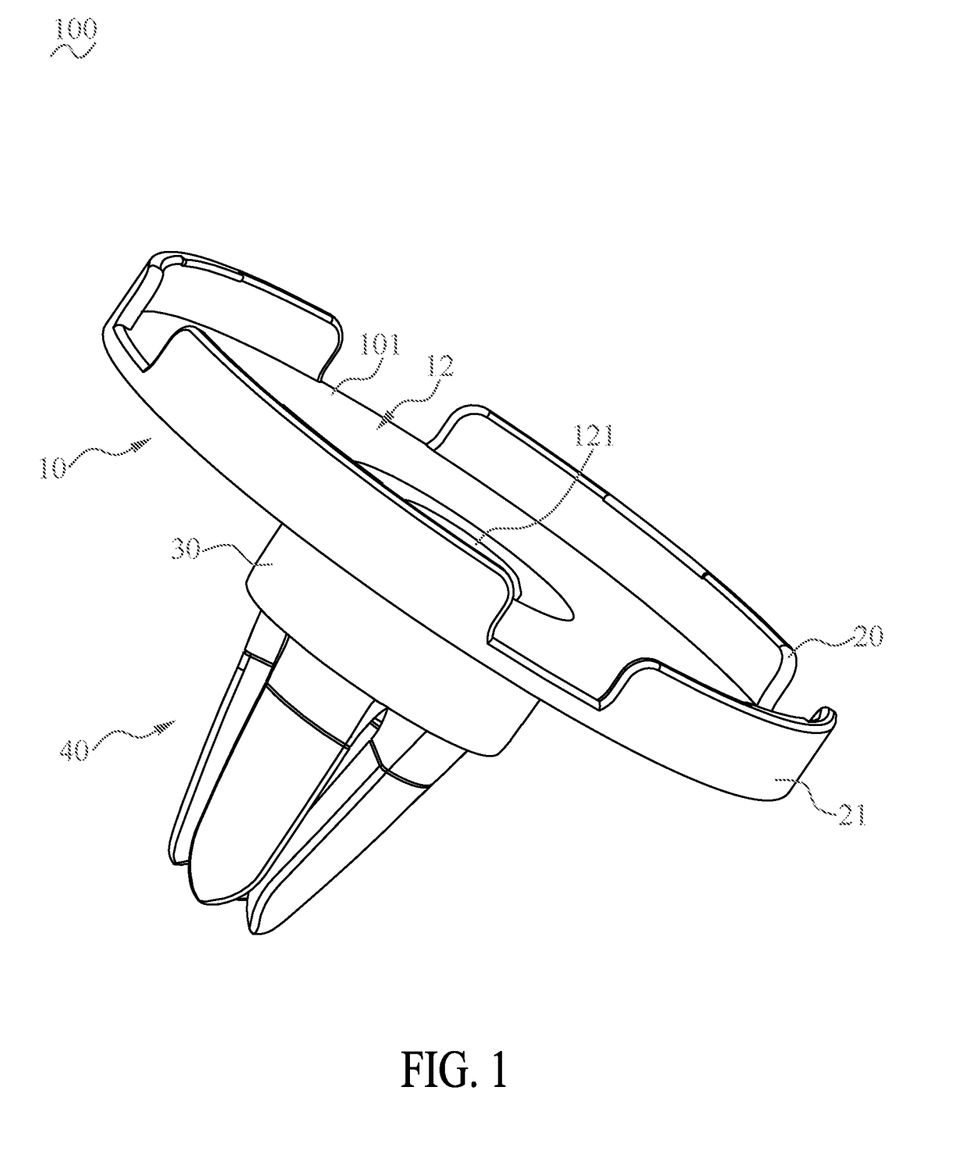
FIG. 1 is a perspective view of a vehicle-used bracket in accordance with a preferred embodiment of the present invention.
Figure 2:
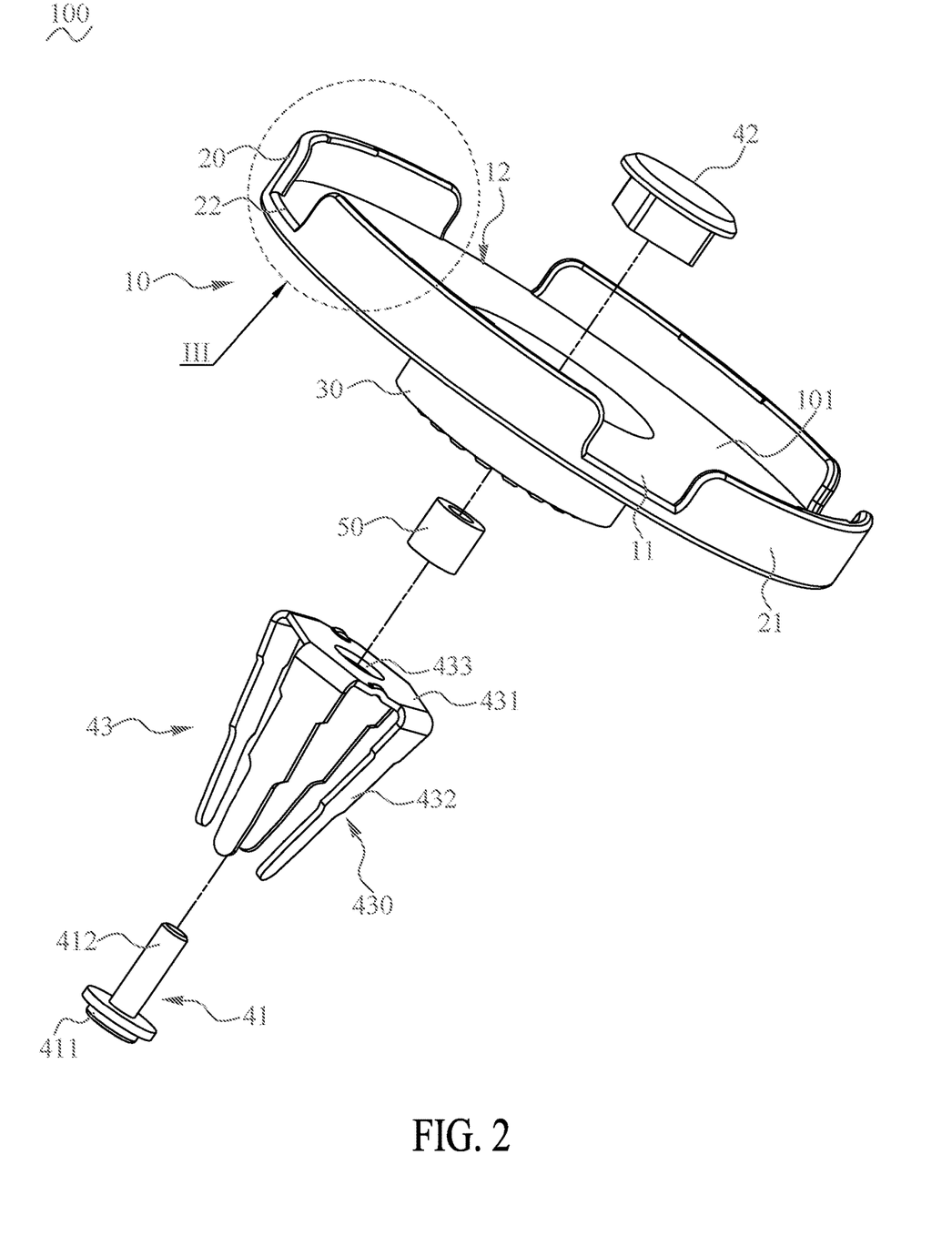
FIG. 2 is an exploded view of the vehicle-used bracket of FIG. 1.
Figure 3:
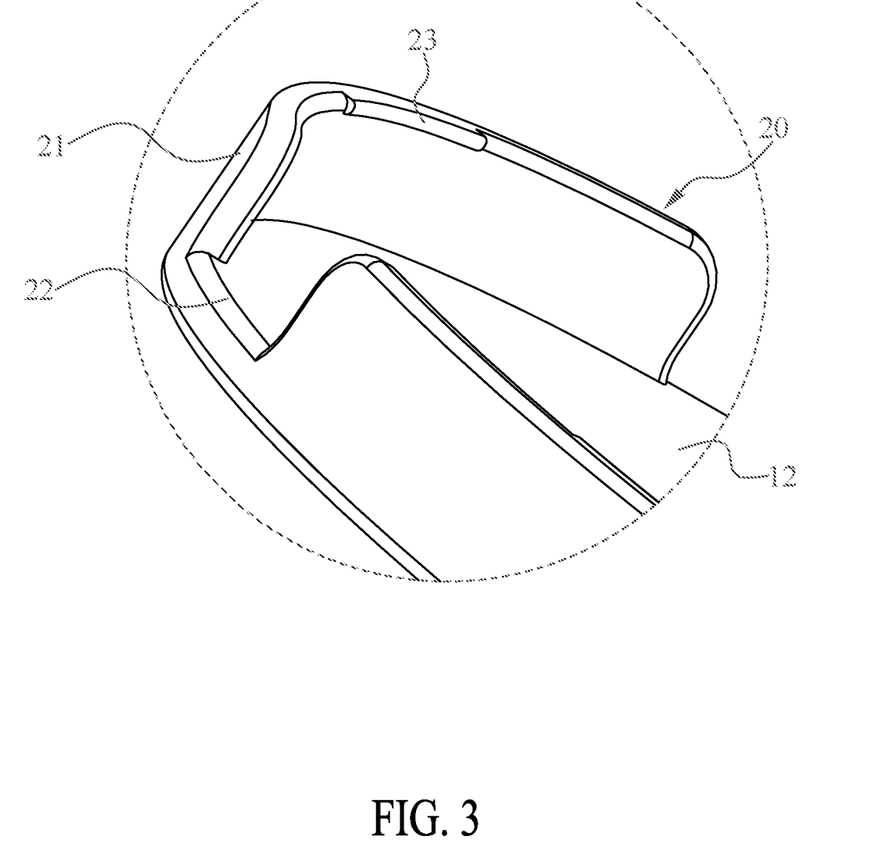
FIG. 3 is an enlarged view of an encircled portion III of a peripheral wall of the vehicle-used bracket of FIG. 1.

With reference to FIG. 2 and FIG. 3, in order to make a user fasten the wireless charger to the vehicle-used bracket 100 of the car conveniently, the base body 10 has a main portion 11, a peripheral wall 20, and the connecting portion 30 fastened to the bottom surface 102 of the base body 10. The main portion 11 is a circular board shape. The peripheral wall 20 is extended upward form a periphery of the top surface 101 of the main portion 11. The peripheral wall 20 is formed in a ring shape. An extending direction of the peripheral wall 20 is perpendicular to the top surface 101 of the main portion 11. The peripheral wall 20 is cooperated with the main portion 11 to form an accommodating space 12 between the main portion 11 and the peripheral wall 20. The accommodating space 12 receives the wireless charger (not shown). The accommodating space 12 is used for fastening the wireless charger (not shown). The peripheral wall 20 includes a plurality of arc blocks 21 and a plurality of intervals 22. The plurality of the arc blocks 21 are mounted around the periphery of the top surface 101 of the main portion 11. Each arc block 21 is arched outward. Each interval 22 is formed between two adjacent arc blocks 21. The plurality of the intervals 22 are communicated between the accommodating space 12 and an outside space. In the preferred embodiment, the peripheral wall 20 includes four arc blocks 21 and four intervals 22. The four arc blocks 21 are mounted around the periphery of the top surface 101 of the main portion 11. A top surface of the peripheral wall 20 extends inward to form at least one protruding portion 23. At least one top surface of the four arc blocks 21 extends inward and towards the accommodating space 12 to form the at least one protruding portion 23. Each two adjacent arc blocks 21 are spaced from each other to form one interval 22. The four intervals 22 are communicated between the accommodating space 12 and the outside space.

At least one top surface of the plurality of the arc blocks 21 extends into the accommodating space 12 to form the at least one protruding portion 23. Top surfaces of the plurality of the arc blocks 21 extend into the accommodating space 12 to form a plurality of the protruding portions 23. The plurality of the protruding portions 23 are positioned around a top of the periphery of the top surface 101 of the main portion 11. The peripheral wall 20 has four protruding portions 23. The wireless charger is blocked in the accommodating space 12 by the plurality of the protruding portions 23. Each protruding portion 23 projects into the accommodating space 12, and each protruding portion 23 abuts against a top surface of the wireless charger, so that the wireless charger is fastened in the base body 10.

With reference to FIG. 1 to FIG. 5, a middle of the bottom surface 102 of the base body 10 extends downward to form the connecting portion 30. The connecting portion 30 is positioned to the bottom surface 102 of the base body 10. The connecting portion 30 is fastened to the bottom surface 102 of the main portion 11 of the bracket 10. The connecting portion 30 is shown as a cylinder shape. An extending direction of the connecting portion 30 is perpendicular to the bottom surface 102 of the base body 10. A middle of the connecting portion 30 defines a perforation 31 penetrating through a top surface and a bottom surface of the connecting portion 30. A middle of the base body 10 defines a through-hole 121. The perforation 31 is communicated with the through-hole 121. The perforation 31 is communicated with the accommodating space 12 through the through-hole 121.

Figure 4:
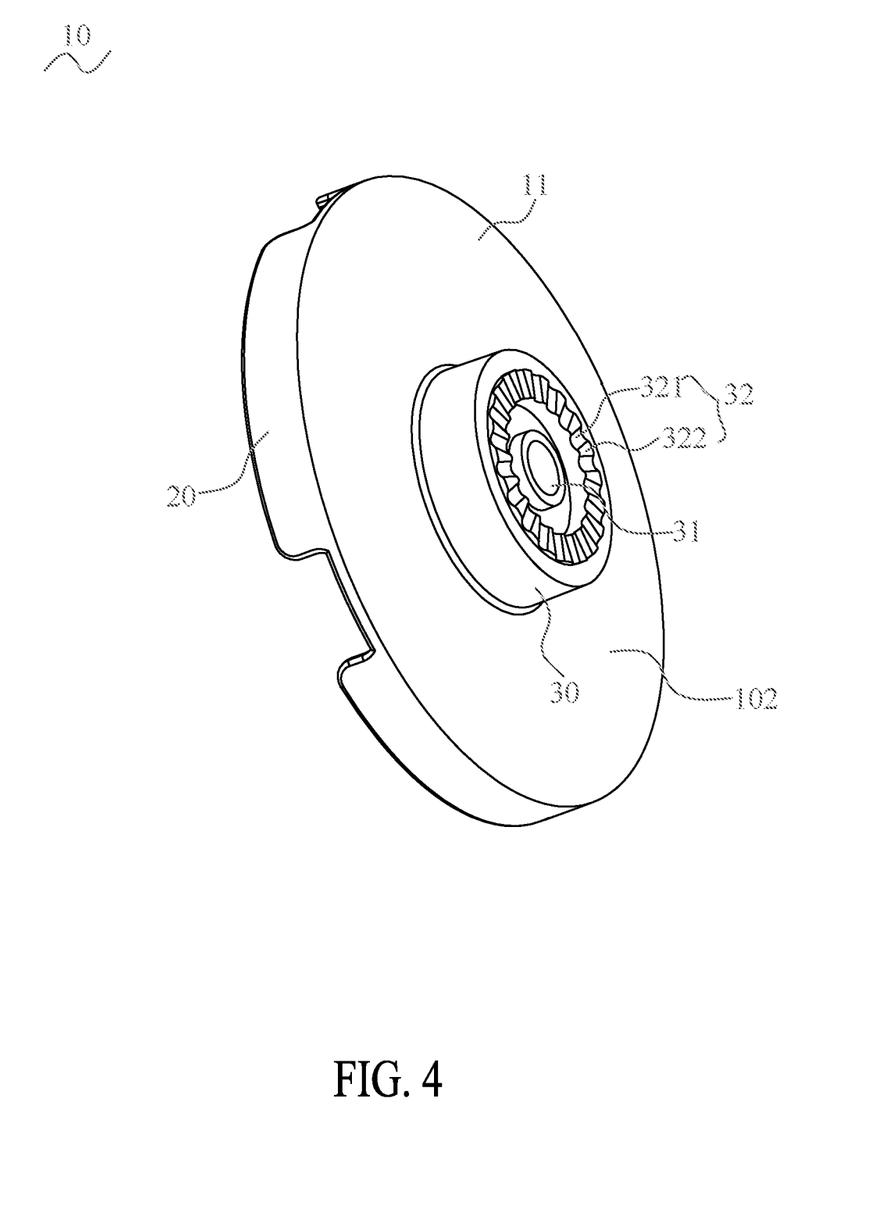
FIG. 4 is a perspective view of a base body of the vehicle-used bracket of FIG. 1.
Figure 6:
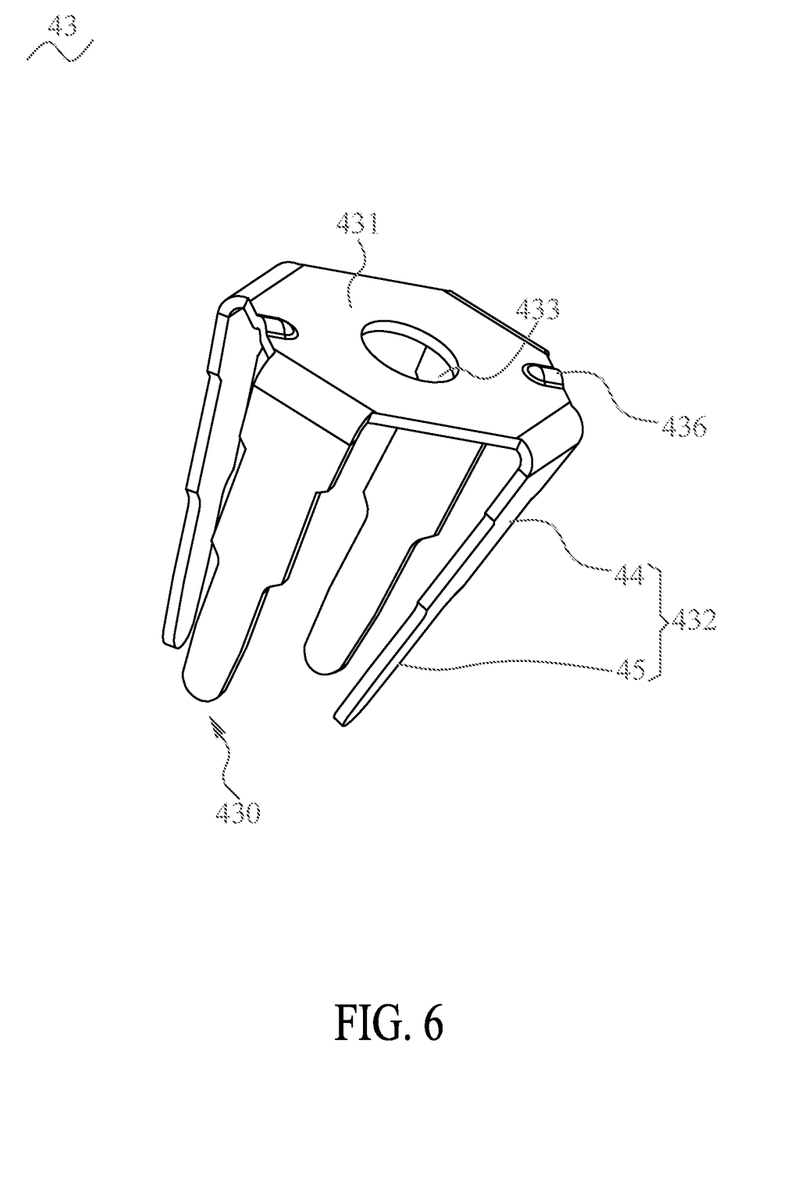
FIG. 6 is a perspective view of a claw of the vehicle-used bracket of FIG. 1.

With reference to FIG. 4 and FIG. 6, a periphery of the bottom surface of the connecting portion 30 extends downward to form a limiting structure 32. The limiting structure 32 is shown as a circular wave shape. The limiting structure 32 includes at least one receiving slot 321 and at least two convex portions 322. The at least two convex portions 322 clamp the at least one receiving slot 321. The limiting structure 32 includes a plurality of receiving slots 321 and a plurality of convex portions 322. Several portions of the bottom surface of the connecting portion 30 extend downward to form the plurality of the convex portions 322. The plurality of the convex portions 322 are spaced from one another. The plurality of the receiving slots 321 are spaced from one another. The plurality of the convex portions 322 and the plurality of the receiving slots 321 are alternatively arranged at the bottom surface of the connecting portion 30. The plurality of the receiving slots 321 and the convex portions 322 are arranged in an annular shape. Each receiving slot 321 is formed between two adjacent convex portions 322. Each convex portion 322 is clamped between two adjacent receiving slots 321.

With reference to FIG. 2 to FIG. 7, the clamping assembly 40 is mounted to the bottom surface of the connecting portion 30. The clamping assembly 40 is mounted to the limiting structure 32. The clamping assembly 40 is mounted under the connecting portion 30. The clamping assembly 40 abuts against a bottom surface of the limiting structure 32. The clamping assembly 40 includes a screw 41, a fastening element 42 and a claw 43. The claw 43 has a fastening piece 431. The fastening piece 431 is disposed under the limiting structure 32 of the connecting portion 30. The fastening piece 431 is abutted against the limiting structure 32 of the connecting portion 30. The fastening piece 431 is disposed towards the plurality of the convex portions 322. The fastening piece 431 abuts against the plurality of the convex portions 322. Several portions of a periphery of the fastening piece 431 slantwise extend downward and inward to form a plurality of clamping portions 432. Free ends of the plurality of the clamping portions 432 gradually approach one another from top to bottom. A middle of the fastening piece 431 defines a fastening hole 433 penetrating through a top surface and a bottom surface of the fastening piece 431. The fastening hole 433 is corresponding to the perforation 31 and the through-hole 121. Specifically, the fastening piece 431 is of a substantially rectangular shape. Four corners of the fastening piece 431 slantwise extend downward and inward to form four clamping portions 432. The free ends of the four clamping portions 432 gradually approach one another from top to bottom.

The claw 43 is mounted under the connecting portion 30. The fastening piece 431 is mounted under the bottom surface of the limiting structure 32. The screw 41 passes upward through the fastening hole 433. The screw 41 is fastened in the perforation 31 of the connecting portion 30 along a down-to-up direction. The screw 41 projects into the through-hole 121. The fastening element 42 is located in the through-hole 121 of the base body 10. The fastening element 42 is mounted around a top end of the screw 41, and the fastening element 42 passes downward through the accommodating space 12, so the fastening element 42 is fastened to the top end of the screw 41. The fastening piece 431 of the claw 43 is fastened to the bottom surface of the connecting portion 30 by virtue of the screw 41 and the fastening element 42. The screw 41 is used for fastening the claw 43. A bottom end of the screw 41 has a nut 411. A middle of a top surface of the nut 411 extends upward to form an insertion portion 412. The fastening piece 431 is adjacent to the nut 411. The nut 411 of the screw 41 abuts against a bottom surface of the fastening piece 431 to prevent the claw 43 from falling off. The insertion portion 412 is perpendicular to the nut 411 of the screw 41. The fastening piece 431 is mounted to the bottom surface of the limiting structure 32. The screw 41 is fastened to the fastening element 42, the fastening element 42 is fastened to a top end of the insertion portion 412 of the screw 41, and the screw 41 is connected to the fastening element 42. The fastening piece 431 is close to the nut 411 of the screw 41.

Figure 7:
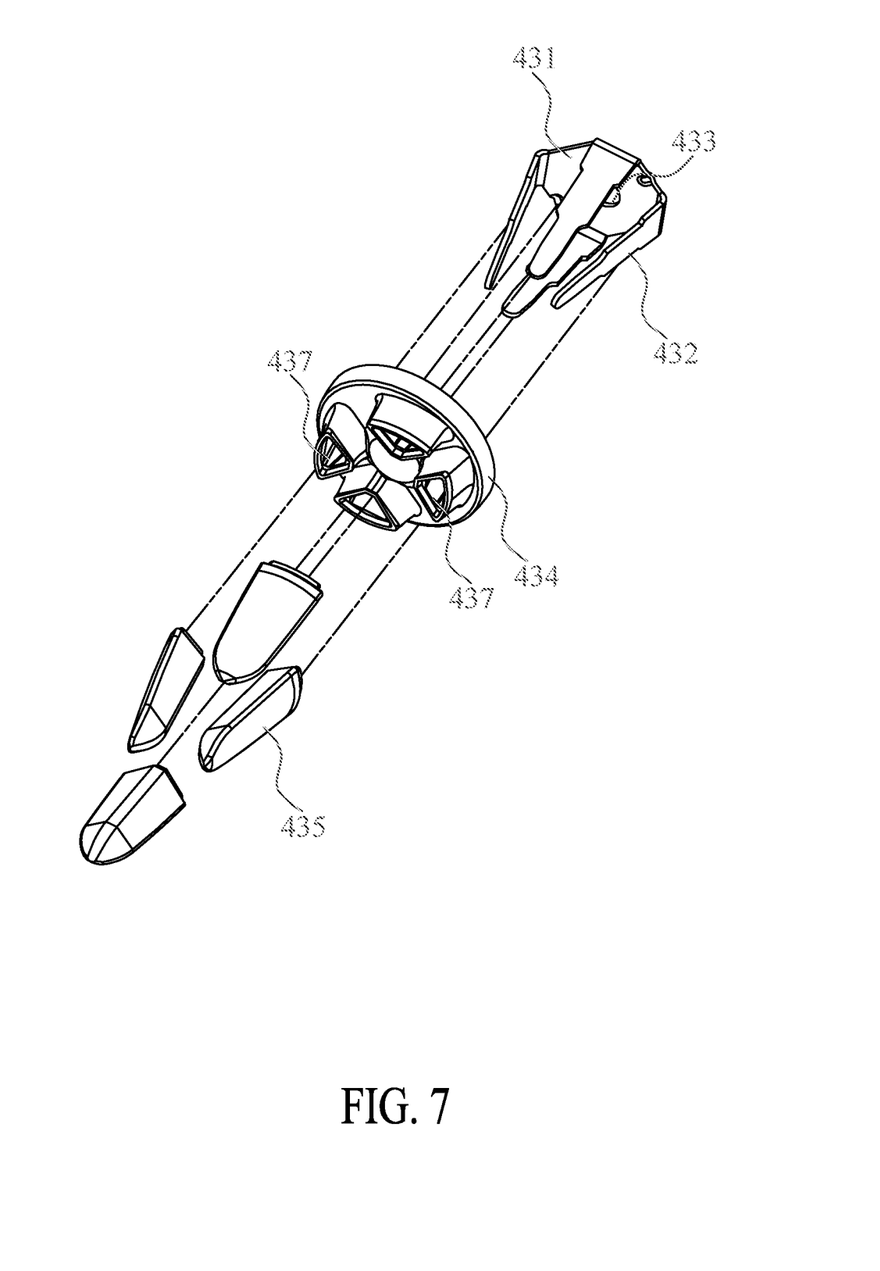
FIG. 7 is a partially exploded view of a clamping assembly of the vehicle-used bracket of FIG. 1.

When each clamping portion 432 extends downward, each clamping portion 432 is gradually inclined inward, so that the plurality of the clamping portions 432 of the claw 43 form a clamping structure 430. The plurality of the clamping portions 432 are used for clamping grids of the air-conditioner outlet of the car. The plurality of the clamping portions 432 of the clamping structure 430 are aggregated inward from top to bottom. In the preferred embodiment, when each clamping portion 432 extends downward, each clamping portion 432 is gradually inclined inward, so that the four clamping portions 432 of the claw 43 form the clamping structure 430. The four clamping portions 432 are aggregated inward from top to bottom, so the vehicle-used bracket 100 is able to be fastened to the grids of the air-conditioner outlet of the car. The car is able to be one of various vehicle types.

Referring to FIG. 2 to FIG. 7, the clamping assembly 40 further includes a chuck bushing 434 and a plurality of sleeves 435. The claw 43 has at least one protruding block 436. The at least one protruding block 436 is corresponding to the at least one receiving slot 321. The at least one protruding block 436 is received in the at least one receiving slot 321. The at least one protruding block 436 is blocked between the at least two convex portions 322. In the preferred embodiment, the clamping assembly 40 includes four sleeves 435. The claw 43 has two protruding blocks 436. The chuck bushing 434 is mounted between the fastening piece 431 and the plurality of the clamping portions 432. The chuck bushing 434 has a plurality of insertion holes 437 penetrating through a top surface and a bottom surface of the chuck bushing 434. The plurality of the clamping portions 432 are inserted downward into the plurality of the insertion holes 437.

An upper portion of each clamping portion 432 is defined as an upper clamping section 44. A lower portion of each clamping portion 432 is defined as a lower clamping section 45. The upper clamping sections 44 of the plurality of the clamping portions 432 are located in the plurality of the insertion holes 437. The lower clamping sections 45 of the plurality of the clamping portions 432 are exposed out of the chuck bushing 434. In the preferred embodiment, the chuck bushing 434 has four insertion holes 437. The four clamping portions 432 are inserted into the four insertion holes 437. The upper clamping sections 44 of the four clamping portions 432 are located in the four insertion holes 437. The lower clamping sections 45 of the four clamping portions 432 are exposed out of the chuck bushing 434. The plurality of the clamping portions 432 are corresponding to the plurality of the sleeves 435. The plurality of the clamping portions 432 are inserted into the plurality of the sleeves 435. The plurality of the sleeves 435 are fastened around the plurality of the clamping portions 432. The lower clamping sections 45 of the plurality of the clamping portions 432 are inserted into the plurality of the sleeves 435. The plurality of the sleeves 435 are mounted under the chuck bushing 434. The chuck bushing 434 and the plurality of the sleeves 435 are made of elastic materials, so that the grids of the air-conditioner outlet of the car are prevented from being scratched.

At least one portion of a top surface of the fastening piece 431 protrudes upward to form the at least one protruding block 436. The at least one protruding block 436 is corresponding to the at least one receiving slot 321. The top surface of the fastening piece 431 is close to the bottom surface of the connecting portion 30. The at least one protruding block 436 is protruded towards the bottom surface of the connecting portion 30. The top surface of the fastening piece 431 is adjacent to the bottom surface of the connecting portion 30. In the preferred embodiment, two portions of the top surface of the fastening piece 431 of the claw 43 protrude upward to form two opposite protruding blocks 436. The two protruding blocks 436 are corresponding to two receiving slots 321 of the limiting structure 32. The two protruding blocks 436 are received in the two receiving slots 321 of the limiting structure 32. Each protruding block 436 is blocked between two convex portions 322, so that each protruding block 436 is prevented from sliding by the two convex portions 322.

Figure 5:
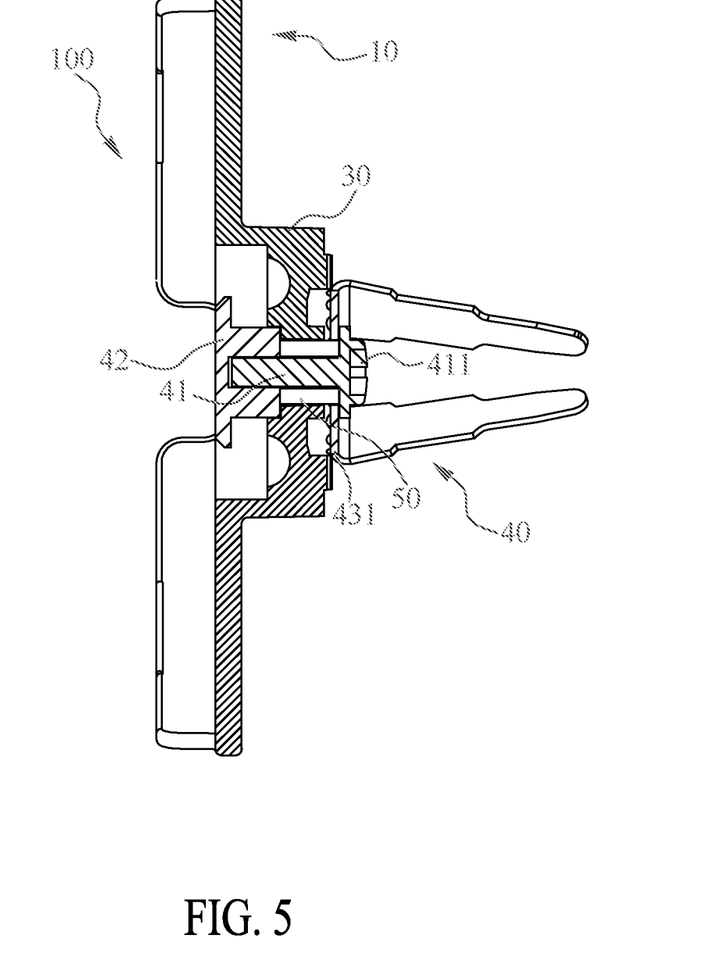
FIG. 5 is a sectional view of the vehicle-used bracket of FIG. 1.

Referring to FIG. 2 and FIG. 5, in order to increase a convenience of the user, at least one of the base body 10 and the clamping assembly 40 selectively rotates. The base body 10 is able to rotate with respect to the clamping assembly 40. The clamping assembly 40 is able to rotate with respect to the base body 10. The base body 10 and the clamping assembly 40 are able to rotate relative to each other. When the clamping assembly 40 rotates to an angle to be fastened to the grids of the air-conditioner outlet of the car, the base body 10 rotates on the clamping assembly 40 according to a user's requirement. When the user rotates the base body 10 or the claw 43 of the clamping assembly 40 to a proper angle, each protruding block 436 is further prevented from sliding by the two convex portions 322, so that the base body 10 or the claw 43 of the clamping assembly 40 is prevented from rotating accidentally.

Several portions of the bottom surface of the fastening piece 431 extend downward and are slightly inclined inward to form a plurality of the upper clamping sections 44. Bottom ends of the plurality of the upper clamping sections 44 extend downward and are slightly inclined inward to form a plurality of the lower clamping sections 45. The four corners of the fastening piece 431 extend downward and are slightly inclined inward to form four upper clamping sections 44. Bottom ends of the four upper clamping sections 44 extend downward and are slightly inclined inward to form four lower clamping sections 45.

The chuck bushing 434 is mounted between the fastening piece 431 and the four clamping portions 432. The chuck bushing 434 is corresponding to the four upper clamping sections 44. The chuck bushing 434 surrounds the nut 411 of the screw 41 and the fastening piece 431 of the claw 43. The chuck bushing 434 is formed by the elastic material.

The chuck bushing 434 is mounted to the fastening piece 431 and the plurality of the clamping portions 432. The plurality of the clamping portions 432 are inserted into the chuck bushing 434. The chuck bushing 434 is corresponding to the plurality of the upper clamping sections 44. The plurality of the upper clamping sections 44 are fastened in the chuck bushing 434. The plurality of the sleeves 435 are corresponding to the plurality of the lower clamping sections 45. The plurality of the lower clamping sections 45 of the plurality of the clamping portions 432 are fastened in the plurality of the sleeves 435.

The chuck bushing 434 surrounds the nut 411 of the screw 41 and the fastening piece 431 of the claw 43. The chuck bushing 434 is used for protecting the grids of the air-conditioner outlet of the car, so that the grids of the air-conditioner outlet of the car are prevented from being scratched.

In the preferred embodiment, the four sleeves 435 are corresponding to the four clamping portions 432. The four clamping portions 432 are inserted into the four sleeves 435. The four sleeves 435 are fastened to the four clamping portions 432. The four sleeves 435 are corresponding to the four lower clamping sections 45. The four lower clamping sections 45 are fastened in the four sleeves 435. The four sleeves 435 are formed by the elastic material. The plurality of the sleeves 435 are used for protecting the grids of the air-conditioner outlet of the car, so that the grids of the air-conditioner outlet of the car are prevented from being scratched.

At least one portion of the top surface of the fastening piece 431 of the claw 43 is arched towards the bottom surface of the connecting portion 30 to form the at least one protruding block 436. The at least one portion of the top surface of the fastening piece 431 of the claw 43 is arched towards the limiting structure 32 to form the at least one protruding block 436. The at least one protruding block 436 is corresponding to the limiting structure 32. The at least one protruding block 436 is engaged with the limiting structure 32. The at least one protruding block 436 is limited in the at least one receiving slot 321 of the limiting structure 32 of the connecting portion 30, so the clamping assembly 40 and the base body 10 are prevented from rotating accidentally. The two protruding blocks 436 are limited in the two receiving slots 321 of the limiting structure 32, so the clamping assembly 40 and the base body 10 are prevented from rotating accidentally. The two protruding blocks 436 are restricted among the plurality of the convex portions 322 of the limiting structure 32.

The buffering element 50 is shown as a hollow cylinder shape. The buffering element 50 is closely mounted in the perforation 31 of the connecting portion 30 and the fastening hole 433 of the fastening piece 431 of the claw 43. A top of the claw 43 surrounds the buffering element 50. The screw 41 of the clamping assembly 40 penetrates through a middle of the claw 43 and a middle of the buffering element 50, and the screw 41 is fastened in the fastening element 42 of the clamping assembly 40. A bottom end of the buffering element 50 is exposed out of the perforation 31. The bottom end of the buffering element 50 abuts against the nut 411 of the screw 41. The buffering element 50 abuts between an inner wall of the perforation 31 and the nut 411 of the screw 41. The buffering element 50 is closely mounted between the inner wall of the perforation 31 of the connecting portion 30 of the base body 10 and the screw 41 of the clamping assembly 40, so at least one of the base body 10 and the clamping assembly 40 is selectively rotated. An outer periphery of the bottom end of the buffering element 50 abuts against an inner wall of the fastening hole 433. The buffering element 50 is fastened to the base body 10 and the clamping assembly 40. The buffering element 50 is tightly cooperated with the perforation 31 of the connecting portion 30, and the fastening hole 433, the screw 41 and the fastening element 42 of the clamping assembly 40, so when the user rotates the vehicle-used bracket 100, the user is able to selectively rotate the base body 10 or the clamping assembly 40.

As described above, the base body 10 includes the main portion 11 and the peripheral wall 20, the peripheral wall 20 is mounted around the top surface of the main portion 11, a middle of the peripheral wall 20 forms the accommodating space 12 between the main portion 11 and the peripheral wall 20, the accommodating space 12 is used for fastening the wireless charger, the top surfaces of the plurality of the arc blocks 21 extend towards the accommodating space 12 to form the plurality of the protruding portions 23, each protruding portion 23 is used for abutting the top surface of the wireless charger, so that the vehicle-used bracket 100 is used for accommodating the wireless charger, and the wireless charger is fastened in the base body 10. In addition, the vehicle-used bracket 100 is fastened to the air-conditioner outlet of the car by virtue of the clamping assembly 40 clamping the grids of the air-conditioner outlet of the car.

What is claimed is:

1. A vehicle-used bracket, comprising:
   a base body having a main portion, a peripheral wall extended upward from a periphery of a top surface of the main portion, and a connecting portion fastened to a bottom surface of the base body, the peripheral wall being cooperated with the main portion to form an accommodating space between the main portion and the peripheral wall, the accommodating space receiving a wireless charger, a middle of the connecting portion defining a perforation penetrating through a top surface and a bottom surface of the connecting portion, a middle of the base body defining a through-hole, the perforation being communicated with the through-hole, the perforation being communicated with the accommodating space through the through-hole, a periphery of the bottom surface of the connecting portion extending downward to form a limiting structure, the limiting structure being shown as a ring shape;
   a clamping assembly mounted to the bottom surface of the connecting portion, the clamping assembly including a screw, a fastening element and a claw, the claw having a fastening piece, the fastening piece being disposed under the limiting structure of the connecting portion, a middle of the fastening piece defining a fastening hole penetrating through a top surface and a bottom surface of the fastening piece, the fastening hole being corresponding to the perforation and the through-hole, at least one portion of a top surface of the fastening piece being arched towards the bottom surface of the connecting portion to form at least one protruding block, the at least one protruding block being corresponding to the limiting structure, the at least one protruding block being limited in the limiting structure of the connecting portion, so the clamping assembly and the base body being prevented from rotating accidentally; and
   a buffering element closely mounted in the perforation of the connecting portion and the fastening hole of the fastening piece of the claw, the screw penetrating through a middle of the buffering element, the screw passing upward through the fastening hole, the screw being fastened in the perforation of the connecting portion, the fastening element being located in the through-hole, the screw projecting into the through-hole, the fastening element being mounted around a top end of the screw, so the fastening element being fastened to the screw, the buffering element being closely mounted between the connecting portion and the clamping assembly, so at least one of the base body and the clamping assembly being selectively rotated.

2. The vehicle-used bracket as claimed in claim 1, wherein the main portion is a circular board shape, the peripheral wall includes four arc blocks and four intervals, each arc block is arched outward, each interval is formed between two adjacent arc blocks, the four arc blocks are mounted around the periphery of the top surface of the main portion, at least one top surface of the four arc blocks extends towards the accommodating space to form at least one protruding portion, each two adjacent arc blocks are spaced from each other to form one interval, the four intervals are communicated between the accommodating space and an outside space.

3. The vehicle-used bracket as claimed in claim 1, wherein the connecting portion is shown as a cylinder shape, a middle of the bottom surface of the base body extends downward to form the connecting portion, an extending direction of the connecting portion is perpendicular to the bottom surface of the base body.

4. The vehicle-used bracket as claimed in claim 1, wherein the clamping assembly abuts against a bottom surface of limiting structure, the limiting structure includes a plurality of receiving slots and a plurality of convex portions, several portions of the bottom surface of the connecting portion extend downward to form the plurality of the convex portions, the fastening piece is disposed towards the plurality of the convex portions, the plurality of the convex portions are spaced from one another, the plurality of the receiving slots are spaced from one another, the plurality of the convex portions and the plurality of the receiving slots are alternatively arranged at the bottom surface of the connecting portion, the plurality of the receiving slots and the convex portions are arranged in the ring shape, each receiving slot is formed between two adjacent convex portions, the top surface of the fastening piece is adjacent to the bottom surface of the connecting portion, two portions of the top surface of the fastening piece of the claw protrude upward to form two opposite protruding blocks, the two protruding blocks are corresponding to two receiving slots of the limiting structure, the two protruding blocks are received in the two receiving slots of the limiting structure.

5. The vehicle-used bracket as claimed in claim 1, wherein a bottom end of the screw has a nut, a middle of a top surface of the nut extends upward to form an insertion portion, the insertion portion is perpendicular to the nut of the screw, the fastening element passes downward through the accommodating space, the fastening element is fastened to a top end of the insertion portion of the screw.

6. The vehicle-used bracket as claimed in claim 5, wherein the fastening piece is of a substantially rectangular shape, the fastening piece is mounted to a bottom surface of the limiting structure, the screw is fastened to the fastening element, and the screw is connected to the fastening element, the fastening piece is close to the nut of the screw.

7. The vehicle-used bracket as claimed in claim 6, wherein four corners of the fastening piece slantwise extend downward and inward to form four clamping portions, each clamping portion has an upper clamping section and a lower clamping section, the four corners of the fastening piece extend downward and are slightly inclined inward to form four upper clamping sections, bottom ends of the four upper clamping sections extend downward and are slightly inclined inward to form four lower clamping sections, the nut abuts against the bottom surface of the fastening piece to prevent the claw from falling off, so that the four clamping portions form a clamping structure, the four clamping portions are aggregated inward from top to bottom.

8. The vehicle-used bracket as claimed in claim 7, wherein the clamping assembly further includes a chuck bushing, the chuck bushing has four insertion holes, the chuck bushing is mounted between the fastening piece and the four clamping portions, the four clamping portions are inserted into the four insertion holes, the chuck bushing is corresponding to the four upper clamping sections, the chuck bushing surrounds the nut of the screw and the fastening piece of the claw, the chuck bushing is formed by an elastic material.

9. The vehicle-used bracket as claimed in claim 7, wherein the claw includes four sleeves, the four sleeves are corresponding to the four clamping portions, the four clamping portions are inserted into the four sleeves, the four sleeves are fastened to the four clamping portions, the four sleeves are corresponding to the four lower clamping sections, the four lower clamping sections are fastened in the four sleeves, the four sleeves are formed by an elastic material.

10. The vehicle-used bracket as claimed in claim 1, wherein a bottom end of the screw of the clamping assembly has a nut, the buffering element is closely mounted between an inner wall of the perforation of the connecting portion of the base body and the screw of the clamping assembly, a bottom end of the buffering element is exposed out of the perforation, the bottom end of the buffering element abuts against the nut of the screw, an outer periphery of the bottom end of the buffering element abuts against an inner wall of the fastening hole, the buffering element is shown as a hollow cylinder shape.

11. The vehicle-used bracket as claimed in claim 1, wherein an extending direction of the peripheral wall is perpendicular to the top surface of the main portion.

12. A vehicle-used bracket adapted for clamping a wireless charger, comprising:
a base body having a main portion, and a peripheral wall extended upward from a periphery of a top surface of the main portion, the peripheral wall being cooperated with the main portion to form an accommodating space between the main portion and the peripheral wall, the accommodating space receiving the wireless charger;
a connecting portion fastened to a bottom surface of the base body, a middle of the connecting portion defining a perforation penetrating through a top surface and a bottom surface of the connecting portion, a middle of the base body defining a through-hole, the perforation being communicated with the through-hole, the perforation being communicated with the accommodating space through the through-hole, a periphery of the bottom surface of the connecting portion extending downward to form a limiting structure;
a clamping assembly mounted to the bottom surface of the connecting portion, the clamping assembly including a screw, a fastening element and a claw, the claw having a fastening piece, the fastening piece being disposed under the limiting structure of the connecting portion, a middle of the fastening piece defining a fastening hole penetrating through a top surface and a bottom surface of the fastening piece, the fastening hole being corresponding to the perforation and the through-hole, at least one portion of a top surface of the fastening piece being arched towards the bottom surface of the connecting portion to form at least one protruding block, the at least one protruding block being corresponding to the limiting structure, the at least one protruding block being limited in the limiting structure of the connecting portion, several portions of a periphery of the fastening piece slantwise extending downward and inward to form a plurality of clamping portions, the plurality of the clamping portions of the claw forming a clamping structure; and
a buffering element closely mounted in the perforation of the connecting portion and the fastening hole of the fastening piece of the claw, the screw penetrating through a middle of the buffering element, the screw passing upward through the fastening hole, the screw being fastened in the perforation of the connecting portion, the fastening element being located in the through-hole, the screw projecting into the through-hole, the fastening element being mounted around a top end of the screw, so the fastening element being fastened to the screw, the buffering element being closely mounted between the connecting portion and the clamping assembly, so at least one of the base body and the clamping assembly being selectively rotated.

13. A vehicle-used bracket adapted for clamping a wireless charger, comprising:
- a base body having a main portion, and a peripheral wall extended upward from a periphery of a top surface of the main portion, the peripheral wall being cooperated with the main portion to form an accommodating space between the main portion and the peripheral wall, the accommodating space receiving the wireless charger, the peripheral wall being formed in a ring shape, a top surface of the peripheral wall extending inward to form at least one protruding portion;
- a connecting portion positioned to a bottom surface of the base body, a middle of the connecting portion defining a perforation penetrating through a top surface and a bottom surface of the connecting portion, a middle of the base body defining a through-hole, the perforation being communicated with the through-hole, the perforation being communicated with the accommodating space through the through-hole, a periphery of the bottom surface of the connecting portion extending downward to form a limiting structure;
- a clamping assembly mounted to the limiting structure, the clamping assembly including a screw, a fastening element and a claw, the claw having a fastening piece, the fastening piece being abutted against the limiting structure of the connecting portion, a middle of the fastening piece defining a fastening hole penetrating through a top surface and a bottom surface of the fastening piece, the fastening hole being corresponding to the perforation and the through-hole, at least one portion of a top surface of the fastening piece being arched towards the limiting structure to form at least one protruding block, the at least one protruding block being engaged with the limiting structure, several portions of a periphery of the fastening piece slantwise extending downward and inward to form a plurality of clamping portions, each clamping portion having an upper clamping section and a lower clamping section, several portions of the bottom surface of the fastening piece extending downward and being slightly inclined inward to form a plurality of the upper clamping sections, bottom ends of the plurality of the upper clamping sections extending downward and being slightly inclined inward to form a plurality of the lower clamping sections;
- a buffering element closely mounted in the perforation of the connecting portion and the fastening hole of the fastening piece of the claw, the screw penetrating through a middle of the buffering element, the screw passing upward through the fastening hole, the screw being fastened in the perforation of the connecting portion, the fastening element being located in the through-hole, the screw projecting into the through-hole, the fastening element being mounted around a top end of the screw, so the fastening element being fastened to the screw, the buffering element being closely mounted between the connecting portion and the clamping assembly, so at least one of the base body and the clamping assembly being selectively rotated;
- a chuck bushing mounted between the fastening piece and the plurality of the clamping portions, the chuck bushing having a plurality of insertion holes penetrating through a top surface and a bottom surface of the chuck bushing, the plurality of the clamping portions being inserted downward into the plurality of the insertion holes, the upper clamping sections of the plurality of the clamping portions being located in the plurality of the insertion holes, the lower clamping sections of the plurality of the clamping portions being exposed out of the chuck bushing; and
- a plurality of sleeves, the plurality of the lower clamping sections of the plurality of the clamping portions being fastened in the plurality of the sleeves.

14. The vehicle-used bracket as claimed in claim 13, wherein the chuck bushing and the plurality of the sleeves are made of elastic materials.

* * * * *